Oct. 24, 1961  H. A. NUNNEMACHER  3,005,669
FLUID PRESSURE CYLINDER
Filed Oct. 23, 1959  3 Sheets-Sheet 1
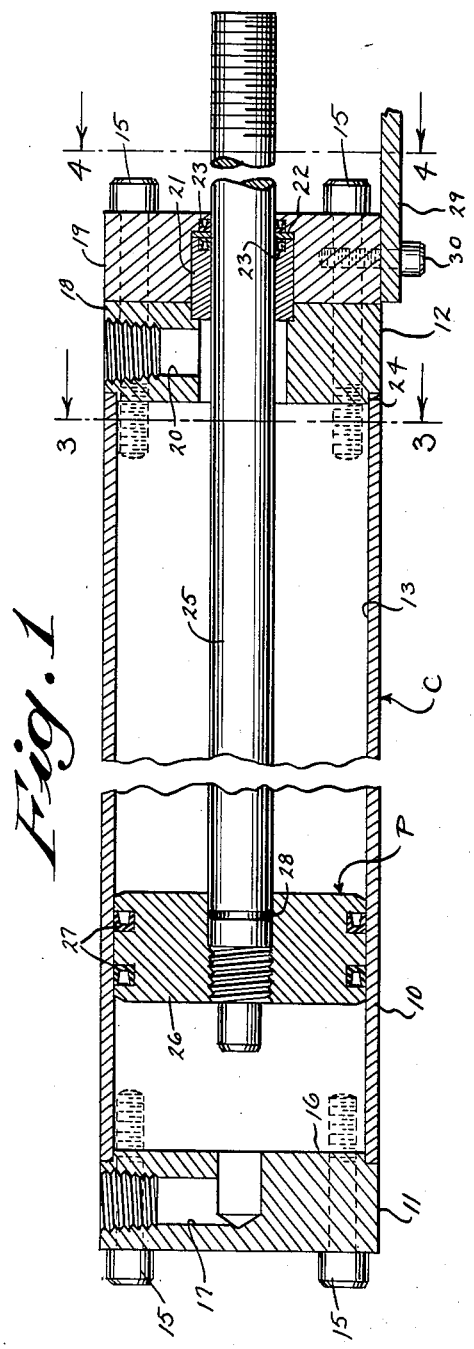
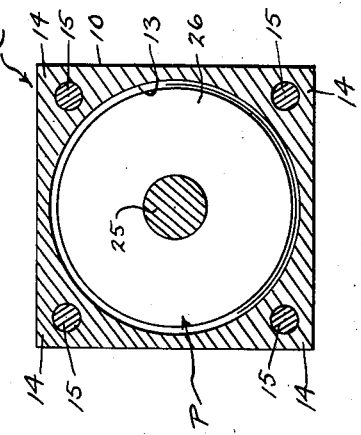
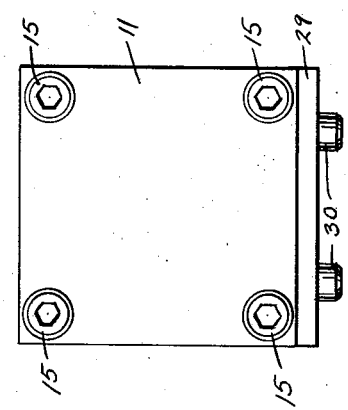
INVENTOR
HERMANN A. NUNNEMACHER
BY *Wright & Wright*
ATTORNEYS Oct. 24, 1961  H. A. NUNNEMACHER  3,005,669
FLUID PRESSURE CYLINDER
Filed Oct. 23, 1959  3 Sheets-Sheet 2

INVENTOR
HERMANN A. NUNNEMACHER

BY Wright & Wright
ATTORNEYS

Oct. 24, 1961 — H. A. NUNNEMACHER — 3,005,669
FLUID PRESSURE CYLINDER
Filed Oct. 23, 1959 — 3 Sheets-Sheet 3

INVENTOR
HERMANN A. NUNNEMACHER

BY
Wright and Wright
ATTORNEYS

United States Patent Office 3,005,669
Patented Oct. 24, 1961

3,005,669
FLUID PRESSURE CYLINDER
Hermann A. Nunnemacher, Pewaukee, Wis., assignor to Galland-Henning Manufacturing Company, Milwaukee, Wis., a corporation of Wisconsin
Filed Oct. 23, 1959, Ser. No. 848,302
2 Claims. (Cl. 309—2)

This invention appertains to fluid actuated cylinder and piston assemblies, and more particularly to a novel cylinder construction for such assemblies.

One of the primary objects of the invention is to provide a cylinder including its barrel and heads, which is of such a construction that the same will occupy a minimum amount of space for its working capacity, and one in which all tie rods extending from head to head are eliminated, whereby a smooth exterior contour will be had eliminating dust collecting crevices and the like, and one which can be easily cleaned and maintained in a bright, presentable condition.

Another salient object of the invention is to provide a fluid pressure cylinder having a square external shape in cross-section, whereby to provide substantially flat cylinder receiving end faces, the corners of the cylinder around the cylindrical piston receiving bore constituting cylinder strengthening portions, and means for receiving cap screws to firmly secure the heads directly to the cylinder against said cylinder end faces, without the necessity of employing external tie rods and the like.

A further important object of the invention is to provide a pressure cylinder in which the cap screws employed for securing the heads directly to the cylinder are utilized for securing various types of mounting brackets directly to the cylinder.

Another further important object of the invention is to provide a cylinder construction in which substantial end cylinder heads can be employed and mounted for replacement and repairs in a convenient manner directly to the cylinder itself, and with the heads constituting a continuation of the sides of the cylinder and flush therewith, and one in which one head can be removed without disturbing another.

A still further object of my invention is to provide a cylinder of a square external shape in cross-section which can be secured flat against a supporting surface or upright against a supporting surface, with or without an end head, the material of the cylinder at the corners thereof constituting means for receiving securing cap screws extending through the supporting member or surface.

A still further important object of the invention is to provide a cylinder of the above character, which will be durable and efficient in use and one that will be economical and easy to maintain in service.

With these and other objects in view, the invention consists in the novel construction, arrangement and formation of parts, as will be hereinafter more specifically described and claimed and illustrated in the accompanying drawings, in which drawings, FIGURE 1 is a longitudinal central sectional view through the improved cylinder and piston assembly;

FIGURE 2 is an end elevational view of the cylinder looking toward the blind end of the cylinder head;

FIGURE 3 is a transverse sectional view through the assembly taken on the line 3—3 of FIGURE 1, looking in the direction of the arrows;

Figure 12:
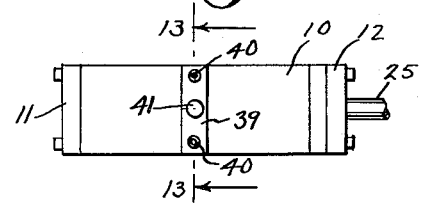
FIGURE 12 is a side elevational view of my improved cylinder illustrating one manner of attaching trunnion brackets directly to the cylinder at a selected point intermediate its ends.
Figure 13:
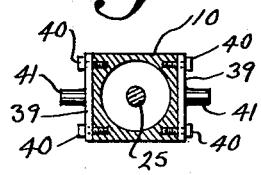
FIGURE 13 is a transverse sectional view through the cylinder with the trunnion mount, the section being taken on the line 13—13 of FIGURE 2, looking in the direction of the arrows.
Figure 14:
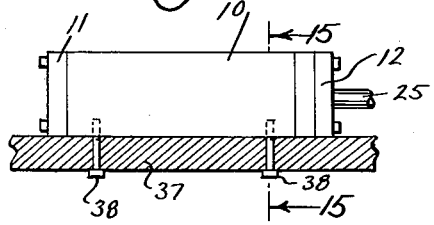
Figure 15:
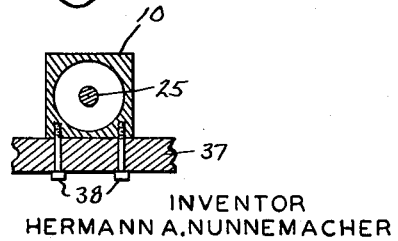

FIGURE 14 is a side elevational view of the cylinder showing the same placed on its side and secured flat against the supporting member, the supporting member being shown in section to illustrate the fastening screws extending through the supporting member and into the corners of the cylinder, and FIGURE 15 is a transverse sectional view through the cylinder and the supporting member taken on the line 15—15 of FIGURE 14, looking in the direction of the arrows, all of the FIGURES 8 to 15, inclusive, being shown on a smaller scale than FIGURES 1 to 7, inclusive.

Referring to the drawings in detail, wherein similar reference characters designate corresponding parts throughout the several views, the letter C generally indicates the improved cylinder having reciprocally mounted therein a piston assembly P.

The cylinder assembly C which forms the essential part of this invention includes a cylinder barrel 10, and end heads 11 and 12. The end head 11 constitutes the blind end of the cylinder assembly and the head 12 constitutes the support and means for slidably receiving the piston rod as will be later pointed out.

In accordance with the invention, the barrel 10 is of a square shape in cross-section having a concentric, longitudinally extending cylindrical bore 13 in which is slidably mounted the piston, as will be later described and numbered. By having the barrel 10 of a square shape in cross-section, four longitudinally extending reinforcing corners 14 are provided and these ribs or corners at their ends provide sufficient material for receiving cap screws 15 for firmly securing the end heads 11 and 12 in place directly to the barrel itself.

The cylinder 10 can be formed from various types of metal, depending on the use of the cylinder, its diameter and length dimensions and pressure employed therewith. For relatively small, low pressure cylinders aluminum can be employed and for high pressure cylinders, the desired grade of steel can be employed. As the cylinder 10 is of a square shape in cross-section, flat end faces are formed against which the cylinder heads 11 and 12 can tightly and intimately abut.

Referring more particularly to the cylinder head 11, the same is of a square shape in end elevation and corresponds to the size and shape of a cylinder terminal. The inner face of the head 11 is preferably rabbeted or provided with a circular boss 16 of a diameter equal to the interior diameter of the cylinder, and this boss is adapted to snugly fit within and close the cylinder terminal. As previously set forth, the head 11 is firmly secured to its cylinder terminal by cap screws 15 and these screws extend entirely through the head 11 and into the corners of the barrel 10. The head 11 can be provided with a port 17, or ports, for entrance and escape of fluid and it might be noted that the present cylinder and its piston assembly has been constructed for use with air under pressure, but is equally adapted for use with hydraulic fluid.

The head 12 for convenience, is preferably formed of an inner section 18 and an outer section 19. Both of these sections 18 and 19 are of the same size and shape and of the same size as the cross-sectional configuration of the barrel 10. The cap screws 15 extend entirely through both sections and into the corners of the barrel. The inner section 18 is provided with a port 20 for the entrance and the exit of the operating fluid. The section 19 is utilized for slidably supporting the rod of the piston assembly and this section can be provided with wear bearings 21, a wiper ring 22 and oil seals 23. The inner face of the section 18 is also preferably provided with the circular boss 24 for fitting within its barrel terminal.

The piston assembly P includes a piston rod 25 which slidably extends through the head 12 and the piston body 26. The piston body 26 can be provided with any preferred type of rings or seals 27, and this body is secured to its rod in any preferred way. As illustrated, the piston body 26 is threaded on the rod and a sealing ring 28 can be provided between the rod and the piston body to prevent leakage of fluid past these two elements.

One of the important features of the invention is that various types of mounting brackets can be utilized with the cylinder and that the brackets are all secured directly to the cylinder assembly. Due to the compact arrangement of the cylinder assembly, the same can be conveniently mounted in places of restricted area, and can be secured in place in different positions.

As illustrated in FIGURES 1 to 4, a mounting plate 29 can be secured directly to the head 12 by cap screws 30, and the cap screws 30 can be threaded into the desired parts of the section 19 of the head 12. It is to be noted that the plate 29 extends substantially in the same plane as the lower face of this cylinder.

Figure 4:
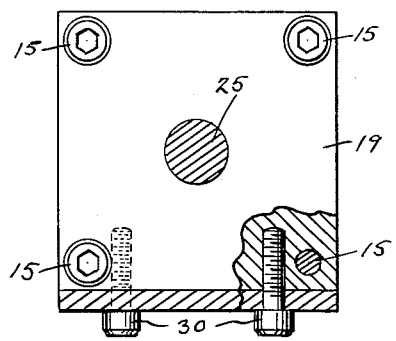
FIGURE 4 is a sectional view taken on the line 4—4 of FIGURE 1, looking in the direction of the arrows and toward the cylinder head which slidably receives and supports the piston rod.
Figure 5:
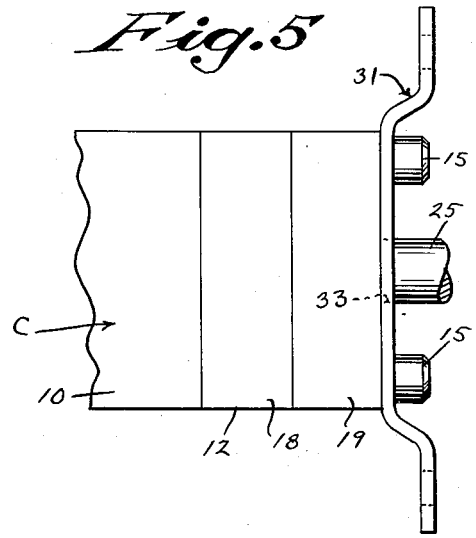
FIGURE 5 is a fragmentary side elevational view of the cylinder and piston assembly illustrating another form of mounting bracket, i.e., a so-called flange mount.
Figure 6:
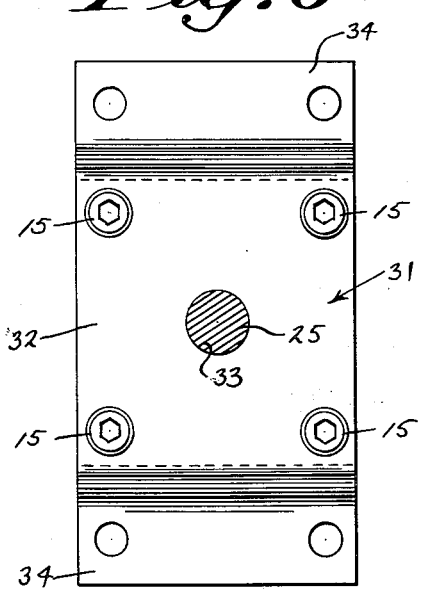
FIGURE 6 is an end elevational view with the piston rod in section illustrating the flange mounting bracket in place of the cylinder.

In FIGURES 5 and 6 I have shown a flange type of mounting bracket, and this bracket is indicated by the reference character 31. The bracket includes a flat body portion 32 which can fit flat up against the outer face of the section 19 of the head 12 and this body portion 32 is provided with a central opening 33 through which the piston rod 25 passes. The ends of the bracket plates are provided with offset mounting flanges 34. With a mounting plate of this type, the same can be firmly secured in place directly to the cylinder by the same cap screws 15 employed for holding the head 12 in place.

Figure 7:
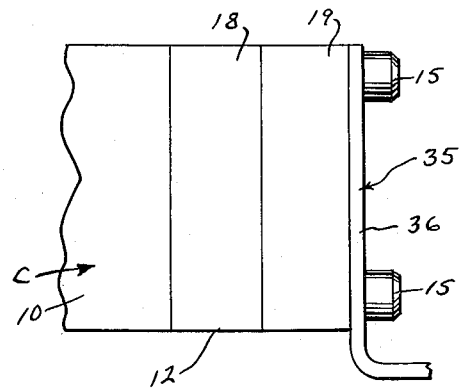
FIGURE 7 is a view similar to FIGURE 5, but showing the mounting bracket of the foot type secured to the cylinder.

In FIGURE 7, I have illustrated the use of a mounting bracket 35 of the foot type and this bracket includes a flat body plate 36 fitted against the outer face of the cylinder head 12 and the bracket is secured in place by the same cap screws 15 utilized for holding the head 12 in place.

One of the important features of the invention is that the cylinder can be secured in place with or without the use of brackets, and this is best shown in FIGURES 8 to 11, inclusive, and FIGURES 14 and 15. Thus, the cylinder itself can be secured flat against a desired supporting surface or upright from either end on a supporting surface.

Figures 8, 9, 10:
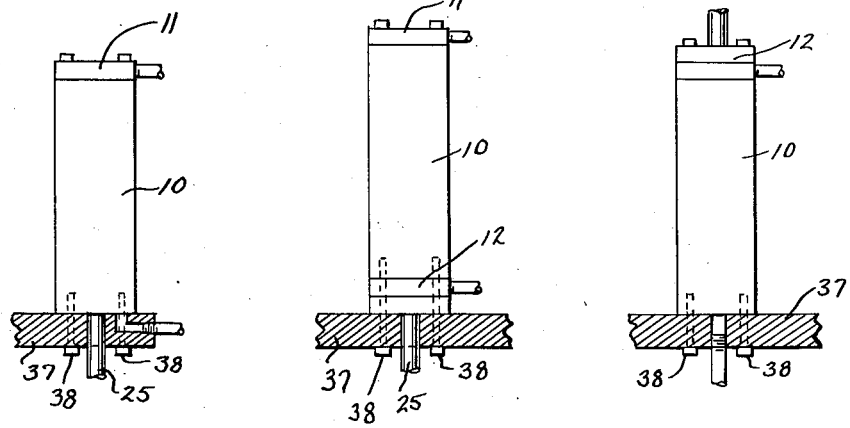
FIGURE 8 is a side elevational view of my cylinder placed on its end and secured to a supporting member with the securing screws extending through the member and into the corners of the cylinder, the supporting member being shown in section, the view also showing the cylinder in place with the rod end cylinder heads removed and the support forming a closure for the inner end of the cylinder.
FIGURE 9 is a view similar to FIGURE 8, but showing the cylinder heads at the rod end in place.
FIGURE 10 is a view similar to FIGURE 8 but showing the cylinder in a reverse position and with the cylinder head at the blind end removed.

In FIGURE 8 I have shown the cylinder 10 placed upright at right angles on a supporting member 37 which may be any part of a machine or appliance. As illustrated, the end of the cylinder is fitted flat against the supporting member 37 and the head 12 can be dispensed with, the supporting member itself can then be provided with the necessary ports leading into the cylinder and a guide opening for the piston rod 25.

In FIGURE 9 I have shown the head 12 in place. In each type of installation cap screws 38 are utilized and these cap screws extend through the supporting member 37 and into the corners of the cylinder.

In FIGURE 10 I have shown the cylinder mounted upright on the supporting surface 37 at the blind end of the cylinder and the cylinder head 11 is omitted and the supporting member can be provided with a port or ports for the entrance and exit of fluid.

Figure 11:
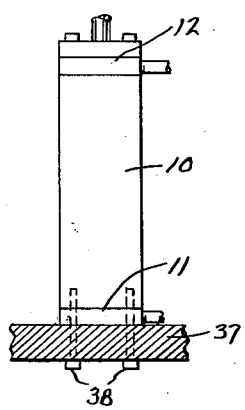
FIGURE 11 is a view similar to FIGURE 10 but showing the cylinder head at the blind end in place.

In FIGURE 11 I have shown the cylinder 10 mounted in the same manner as shown in FIGURE 10, but in FIGURE 11 I have shown the cylinder head 11 in place. In each instance, fastening elements 38 are utilized which extend through the supporting member 37 and into the corners of the cylinder. Obviously, in FIGURES 9 and 11, the screws 38 also extend through the cylinder heads.

The cylinder 10 lends itself admirably, for so-called trunnion mounting, where the cylinder is pivotally supported at any selected point intermediate its ends. This is best shown in FIGURES 12 and 13. Mounting plates 39 can be placed flat against the opposite sides of the cylinder at any desired selected point throughout the length of the cylinder and these mounting plates can be secured directly to the cylinder by fastening screws 40 which extend into the corners of the cylinder. The plates 39 carry the trunnions 41. In lieu of mounting plates, I could employ a square bracket slipped over the cylinder to the desired point and then secure the bracket at the selected point on the cylinder by screws extending into the corners of the cylinder.

In FIGURES 14 and 15 I have shown the cylinder laid on its side flush against the supporting member 37. With this installation, the fastening screws 38 extend through the supporting member 37 and into the corners of the cylinder.

From the foregoing description, it can be seen that a cylinder has been provided of a compact and durable form which will be exceptionally pleasing to the eye and hence this cylinder lends itself for use in installations which are open to view by observers.

It also can be seen that the cylinder is of such a construction that the same can be secured directly to any desired flat surface without the use of brackets.

Various changes in details may be made without departing from the spirit or the scope of this invention; but what I claim as new is:

1. In a cylinder assembly, an elongated barrel of a square shape in cross-section having a cylindrical bore extending longitudinally therethrough defining longitudinally extending corners at spaced points around the bore and flat exterior faces and a trunnion mount for said barrel including flat mounting plates placed flush against the opposite sides of the barrel at a selected point intermediate the ends of the barrel carrying outwardly projecting trunnions, and fastening screws extending through the mounting plates and extending it to said corners.

2. In a cylinder assembly, an elongated barrel of a square shape in cross section having a cylindrical bore extending longitudinally therethrough defining longitudinally extending corners at spaced points around the bore, end heads of a square shape in elevation for the terminals of the barrel having their sides flush with the sides of the cylinder, the inner faces of said heads being provided with circular bosses fitted in the barrel terminals, cap screws extending entirely through the heads and into the corners of the barrel, one of said heads constituting a support for slidably receiving a piston rod, and a mounting bracket having a portion thereof in facial abutment with the outer face of one of said heads, and said bracket being secured to the head and barrel by the said cap screws employed for holding the head in place.

References Cited in the file of this patent

UNITED STATES PATENTS

| | | |
|---|---|---|
| 2,369,505 | Ward | Feb. 13, 1945 |
| 2,410,808 | Christensen | Nov. 12, 1946 |
| 2,744,500 | Verderber | May 8, 1956 |
| 2,944,520 | Swanson | July 12, 1960 |